United States Patent [19]

Asada

[11] Patent Number: 5,087,232
[45] Date of Patent: Feb. 11, 1992

[54] AUTOMATIC TRANSMISSION
[75] Inventor: Toshiyuki Asada, Toyota, Japan
[73] Assignee: Toyota Jidosha Kabushiki Kaisha, Toyota, Japan
[21] Appl. No.: 521,432
[22] Filed: May 10, 1990
[30] Foreign Application Priority Data
  May 10, 1989 [JP] Japan .................. 1-116798
[51] Int. Cl.⁵ ............................................... F16H 57/10
[52] U.S. Cl. ............................................. 475/278; 475/284
[58] Field of Search ............... 475/275, 277, 278, 284, 475/288, 330, 314, 315, 316, 326, 327, 328

[56] References Cited
U.S. PATENT DOCUMENTS

| | | | |
|---|---|---|---|
| 2,518,824 | 8/1950 | Simpson | 475/328 X |
| 3,811,343 | 5/1974 | Mori et al. | 475/284 X |
| 4,233,861 | 11/1980 | Gaus et al. | 74/763 |
| 4,660,439 | 4/1987 | Hiraiwa | 74/763 |
| 4,939,955 | 7/1990 | Sugano | 475/278 |
| 4,963,124 | 10/1990 | Takahashi et al. | 475/278 |

FOREIGN PATENT DOCUMENTS
59-231243 12/1984 Japan .................. 475/284
1-35147 2/1989 Japan .................. 475/278

Primary Examiner—Dwight Diehl
Attorney, Agent, or Firm—Oblon, Spivak, McClelland, Maier & Neustadt

[57] ABSTRACT

A gear train for transmitting the rotation from an input shaft to an output shaft is constituted such that a plurality of speeds are set by a plurality of planetary gear sets, each of which is provided with components including a sun gear, a ring gear and a carrier, and one of the planetary gear sets on one of the speeds does not participate in the transmission of torque from the input shaft to the output shaft. Also, single or a plurality of uniting clutches are provided to selectively interconnect at least either two of the components in the planetary gear set adapted not to participate in the transmission of torque.

26 Claims, 14 Drawing Sheets

| | | CLUTCH MEANS | | | | | | | BRAKE MEANS | | | |
|---|---|---|---|---|---|---|---|---|---|---|---|---|
| | | K1 | K2 | K3 | K4 | K5 | K6 | K7 | B1 | B2 | B3 | B4 |
| 1st | | ○ | | | ○‡ | ○ | | | | ○ | | |
| 2nd | a | ○ | ○ | | | ○ | | | | ○ | | |
| | b | ○ | ○ | | | | | | ○ | ○ | | ○ |
| | c | ○ | | | | | ○ | | ○‡ | | | ○‡ |
| 3rd | | ○ | | | ○ | | ○ | | ○‡ | | | |
| 4th | a | ○ | ○ | ○ | | | ○ | | | | | |
| | b | ○ | ○ | ○ | ○ | | | ○ | | | | |
| | c | | ○ | ○ | ○‡ | | | ○ | | | | |
| 5th | | | ○ | ○ | | | | ○ | | | ○ | |
| Rev | | | | ○ | ○ | | | ○ | | ○ | | |
| (Rev) | | | | ○ | ○ | ○ | | | | ○ | | |

FIG.2

| | CLUTCH MEANS | | | | | | | BRAKE MEANS | | | |
|---|---|---|---|---|---|---|---|---|---|---|---|
| | K1 | K2 | K3 | K4 | K5 | K6 | K7 | B1 | B2 | B3 | B4 |

| | CLUTCH MEANS | | | | | | BRAKE MEANS | | | |
|---|---|---|---|---|---|---|---|---|---|---|
| | K1 | K2 | K3 | K4 | K5 | K6 | B1 | B2 | B3 | B4 |
| 1st | ○ | | | ○ | | | ○ | ○* | | |
| 2nd a | ○ | | | ○ | | | ○ | | ○ | |
| 2nd b | ○ | | | ○ | | | ○ | | | ○ |
| 2nd c | ○ | | | | | ○ | ○ | | | ○* |
| 3rd | ○ | | | | | ○ | ○* | | | |
| 4th a | ○ | | ○ | | | ○ | | | | |
| 4th b | ○ | ○ | ○ | | | ○ | | | | |
| 4th c | ○* | ○ | ○ | | ○ | | | | | |
| 5th | | ○ | ○ | | ○ | | | | ○ | |
| Rev | | | ○ | ○ | | | ○ | ○ | | |

| | | CLUTCH | | | MEANS | | | BRAKE | | MEANS | |
|---|---|---|---|---|---|---|---|---|---|---|---|
| | | K1 | K2 | K3 | K4 | K5 | K7 | B1 | B2 | B3 | B4 |
| 1st | | ○ | | | ○* | ○ | | ○ | ○ | | |
| 2nd | a | ○ | ○ | | | ○ | | ○ | ○ | | |
| | b | ○ | ○ | | | | | ○ | ○ | | |
| | c | ○ | | | | | | ○ | ○ | | ○ |
| | d | ○ | ○ | | | | | ○ | | | ○ |
| | e | ○ | | | ○ | | | ○ | | | ○ |
| | f | ○ | | | ○ | | | ○ | | ○ | ○ |
| | g | ○ | | | ○* | | | ○ | | ○ | |
| 3rd | a | ○ | | ○ | | | | ○ | | | |
| | b | ○ | | ○ | ○ | | | ○* | | | |
| 4th | a | ○ | ○ | ○ | ○ | | | | | | |
| | b | ○ | ○ | ○ | ○ | ○ | | | | | |
| | c | | ○ | ○ | ○* | ○ | | | | | |
| 5th | a | | ○ | ○ | | ○ | | | | ○ | |
| | b | | ○ | ○ | | | ○ | | | ○ | |
| Rev | | | | ○ | ○ | ○ | | ○ | ○ | | |
| (Rev) | | | | ○ | ○ | | ○ | | ○ | | |

| | | CLUTCH MEANS | | | | | | BRAKE MEANS | | | |
|---|---|---|---|---|---|---|---|---|---|---|---|
| | | K1 | K2 | K3 | K4 | K5 | K7 | B1 | B2 | B3 | B4 |
| 1st | | ○ | | | ○‡ | ○ | | ○ | ○ | | |
| 2nd | | ○ | ○‡ | | | ○ | | ○ | | | |
| 3rd | a | ○ | | ○ | | ○ | | | | | |
| | b | ○ | ○ | ○ | | | | ○‡ | | | |
| 4th | a | ○ | ○ | ○ | ○ | | | | | | |
| | b | ○ | ○ | ○ | ○ | ○ | | | | | |
| | c | | ○ | ○ | ○‡ | ○ | | | | | |
| 5th | a | | ○ | ○ | | ○ | | | | ○ | |
| | b | | ○ | ○ | | | ○ | | | ○ | |
| Rev | | | | ○ | ○ | ○ | | ○ | ○ | | |
| (Rev) | | | | ○ | ○ | | ○ | | ○ | | |

| | | CLUTCH MEANS | | | | | | BRAKE MEANS | | |
|---|---|---|---|---|---|---|---|---|---|---|
| | | K1 | K2 | K3 | K4 | K5 | K7 | B1 | B2 | B3 |
| 1st | a | ○ | | | ○ | | | ○ | ○ | |
| | b | ○ | | | ○ | ○‡ | | ○ | ○ | |
| 2nd | | ○ | | | ○‡ | | | ○ | | ○ |
| 3rd | a | ○ | | ○ | | | | | | ○ |
| | b | ○ | ○ | ○ | | | | ○‡ | | |
| 4th | a | ○ | | ○ | ○ | | ○ | | | |
| | b | ○ | ○ | ○ | ○ | | ○ | | | |
| | c | | ○ | ○ | ○‡ | | ○ | | | |
| 5th | | | ○ | ○ | | | ○ | | | ○ |
| Rev | | | | ○ | ○ | ○ | | | ○ | |
| (Rev) | | | | ○ | ○ | | ○ | | ○ | |

| | | CLUTCH MEANS | | | | | | BRAKE MEANS | | |
|---|---|---|---|---|---|---|---|---|---|---|
| | | K1 | K2 | K3 | K4 | K5 | K7 | B1 | B2 | B3 |
| 1st | a | ○ | | | ○ | ○ | | ○ | ○ | |
| | b | ○ | | | ○ | ○# | | ○ | | |
| 2nd | | ○ | | | ○# | | | ○ | | ○ |
| 3rd | a | ○ | | ○ | | | | ○ | | ○ |
| | b | ○ | | ○ | ○ | | | ○# | | |
| 4th | a | ○ | | ○ | ○ | | ○ | | | |
| | b | ○ | ○ | ○ | ○ | | ○ | | | |
| | c | ○# | ○ | ○ | ○ | | ○ | | | |
| 5th | | ○ | | ○ | | | ○ | | | ○ |
| Rev | | | | ○ | ○ | ○ | | | ○ | |
| (Rev) | | | | ○ | ○ | | ○ | | ○ | |

| | | CLUTCH MEANS | | | | | | BRAKE MEAS | | |
|---|---|---|---|---|---|---|---|---|---|---|
| | | K1 | K2 | K3 | K4 | K5 | K7 | B1 | B2 | B3 |
| 1st | a | ○ | | | ○ | ○ | | ○ | ○ | |
| | b | ○ | | | ○ | ○# | | ○ | | |
| 2nd | | ○ | | | ○# | | | ○ | | ○ |
| 3rd | a | ○ | | ○ | | | | ○ | | ○ |
| | b | ○ | | ○ | ○ | | | ○# | | |
| 4th | a | ○ | | ○ | ○ | | ○ | | | ○ |
| | b | ○# | ○ | ○ | | | ○ | | | ○ |
| 5th | | | ○ | ○ | | | ○ | | | ○ |
| Rev | | | | ○ | ○ | ○ | | | ○ | |
| (Rev) | | | | ○ | ○ | | ○ | | ○ | |

FIG. 15

| | CLUTCH MEANS | | | | | | BRAKE MEANS | | | |
|---|---|---|---|---|---|---|---|---|---|---|
| | K1 | K2 | K3 | K4 | K5 | K6 | B1 | B2 | B3 | B4 |
| 1st | ○ | | | ○ | ○* | | ○* | * | | |
| | ○ | | | ○ | ○ | | | ○ | | |
| | ○ | | | ○ | ○ | | ○ | ○ | | |
| 2nd | ○ | ○ | | | ○ | | ○* | * | | * |
| | ○ | ○ | | | ○ | | | ○ | | |
| | ○ | ○ | | | ○ | | | | | ○ |
| | ○ | ○* | | | | | ○ | ○* | | * |
| | ○ | ○ | | | | | ○ | ○ | | ○ |
| | ○ | | | | ○ | | ○* | * | | * |
| | ○ | | | | ○ | | ○ | ○ | | ○ |
| | ○ | | | ○* | | | ○ | | ○* | * |
| | ○ | | | ○ | | | ○ | | ○ | ○ |
| | ○ | | | | | ○ | ○ | | ○ | ○ |
| 3rd | ○ | | ○ | | ○* | | ○* | * | | |
| | ○ | | ○ | | ○ | | | ○ | | |
| | ○ | | ○ | | | | ○ | | ○ | |
| | ○ | | ○ | | | | ○ | | | |
| | ○ | ○ | ○* | * | | * | | | | |
| | ○ | ○ | ○ | ○ | | | | | | |
| | ○ | ○ | | | | ○ | | | | |
| | ○ | | ○* | ○* | | * | | | | |
| | ○ | | ○ | ○ | | ○ | | | | |
| | ○ | | | ○ | | ○ | | | | |
| | ○* | ○ | ○* | | * | | | | | |
| | ○ | ○ | ○ | | ○ | | | | | |
| | ○ | | ○ | | ○ | | | | | |
| 4th | ○ | ○ | ○* | * | ○ | * | | | | |
| | ○ | ○ | ○ | ○ | ○ | | | | | |
| | ○ | ○ | | | ○ | ○ | | | | |
| | ○ | | ○* | ○* | ○ | * | | | | |
| | ○ | | ○ | ○ | ○ | ○ | | | | |
| | ○ | | | ○ | ○ | ○ | | | | |
| | | ○* | ○ | ○* | ○ | * | | | | |
| | | ○ | ○ | ○ | ○ | ○ | | | | |
| | | | ○ | ○ | ○ | ○ | | | | |
| 5th | | ○ | ○ | | ○ | | | | ○ | |
| Rev | | | ○ | | ○ | ○* | ○* | * | | |
| | | | ○ | | ○ | ○ | | ○ | | |
| | | | ○ | | ○ | ○ | ○ | ○ | | |

FIG. 16

| | | CLUTCH MEANS | | | | | | BRAKE MEANS | | | |
|---|---|---|---|---|---|---|---|---|---|---|---|
| | | K1 | K2 | K3 | K4 | K5 | K6 | B1 | B2 | B3 | B4 |
| 1st | | ○ | | | ○* | ○ | | ○ | ○ | | |
| 2nd | a | ○ | ○ | | | ○ | | ○ | ○ | | ○ |
| | b | ○ | ○ | | | | | ○ | | | ○* |
| | c | ○ | | | | | ○ | ○* | | | |
| 3rd | | ○ | | ○ | | | ○ | ○* | | | |
| 4th | a | ○ | ○ | | ○ | ○ | ○ | | | | |
| | b | ○ | | ○ | ○ | ○ | ○ | | | | |
| | c | | | ○ | ○* | ○ | | | | | |
| 5th | | | | ○ | ○ | ○ | | | | ○ | |
| Rev | | | | ○ | ○ | ○ | | ○ | ○ | | |
| (Rev) | | | | ○ | ○ | ○ | | | ○ | | |

FIG. 17A

| | | CLUTCH MEANS | | | | | | BRAKE MEANS | | | |
|---|---|---|---|---|---|---|---|---|---|---|---|
| | | K1 | K2 | K3 | K4 | K5 | K6 | B1 | B2 | B3 | B4 |
| 1st | | ○ | | | ○* | ○ | | | ○ | | |
| 2nd | a | ○ | ○ | | | ○ | | | ○ | | |
| | b | ○ | ○ | | | ○ | | ○ | ○ | | ○ |
| | c | ○ | ○ | | | | | ○ | | | ○ |
| | d | ○ | | | ○ | | | ○ | | | ○ |
| | e | ○ | | | ○ | | | ○ | | ○ | ○ |
| | f | ○ | | | ○* | | | ○ | | ○ | |
| 3rd | a | ○ | ○ | | | | | ○ | | | |
| | b | ○ | | | ○ | | | ○ | | | |
| 4th | a | ○ | ○ | | ○ | ○ | | | | | |
| | b | ○ | ○ | ○ | ○ | ○ | | | | | |
| | c | | ○ | ○ | ○* | ○ | | | | | |
| 5th | | | ○ | | | ○ | | | | ○ | |
| Rev | | | | ○ | ○ | | | ○ | ○ | | |

FIG. 17B

| | | CLUTCH MEANS | | | | | | BRAKE MEANS | | | |
|---|---|---|---|---|---|---|---|---|---|---|---|
| | | K1 | K2 | K3 | K4 | K5 | K6 | B1 | B2 | B3 | B4 |
| 1st | | ○ | | | ○* | ○ | | | ○ | | |
| 2nd | a | ○ | ○ | | | ○ | | | ○ | | |
| | b | ○ | ○ | | | | | ○ | ○ | | ○ |
| | c | ○ | ○ | | | | | ○ | | | ○ |
| | d | ○ | | | | | ○ | ○ | | | ○ |
| 3rd | | ○ | | | | | ○ | | | | |
| 4th | a | ○ | | ○ | | ○ | ○ | | | | |
| | b | ○ | ○ | ○ | ○ | ○ | ○ | | | | |
| | c | | ○ | ○ | ○* | ○ | | | | | |
| 5th | | | ○ | ○ | | ○ | | | | ○ | |
| Rev | | | | ○ | ○ | | | ○ | ○ | | |

FIG. 17C

| | | CLUTCH MEANS | | | | | | BRAKE MEANS | | | |
|---|---|---|---|---|---|---|---|---|---|---|---|
| | | K1 | K2 | K3 | K4 | K5 | K6 | B1 | B2 | B3 | B4 |
| 1st | | ○ | | | ○* | ○ | | | ○ | | |
| 2nd | a | ○ | | | | ○ | | | ○ | | |
| | b | ○ | ○ | | | | | ○ | ○ | | ○ |
| | c | ○ | ○ | | | | | ○ | | | ○ |
| | d | ○ | | | | | ○ | ○ | | | ○ |
| 3rd | | ○ | | ○ | | | ○ | ○ | | | |
| 4th | a | ○ | | ○ | | ○ | ○ | | | | |
| | b | ○ | | ○ | | ○ | ○ | | | | |
| | c | ○* | ○ | ○ | | ○ | ○ | | | | |
| 5th | | | ○ | ○ | | ○ | | | | ○ | |
| Rev | | | | ○ | ○ | | | ○ | ○ | | |

FIG. 18A

| | CLUTCH MEANS | | | | | | BRAKE MEANS | | | |
|---|---|---|---|---|---|---|---|---|---|---|
| | K1 | K2 | K3 | K4 | K5 | K6 | B1 | B2 | B3 | B4 |
| 1st | ○ | | | ○ | | | ○ | ○* | | |
| 2nd | ○ | | | ○ | | | ○ | | ○* | |
| 3rd | ○ | | ○ | ○ | | | ○* | | | |
| 4th a | ○ | ○ | ○ | ○ | | | | | | |
| b | ○ | ○ | ○ | ○ | ○ | | | | | |
| c | | ○ | ○ | ○* | ○ | | | | | |
| 5th | | ○ | ○ | | | | | | ○ | |
| Rev | | | | ○ | ○ | | ○ | ○ | | |

FIG. 18B

| | CLUTCH MEANS | | | | | | BRAKE MEANS | | | |
|---|---|---|---|---|---|---|---|---|---|---|
| | K1 | K2 | K3 | K4 | K5 | K6 | B1 | B2 | B3 | B4 |
| 1st | ○ | | | ○ | | | ○ | ○* | | |
| 2nd a | ○ | | | ○ | | | ○ | | ○ | |
| b | ○ | | | ○ | | | ○ | | | ○ |
| c | ○ | | | | | ○ | ○ | | | ○* |
| 3rd | ○ | | ○ | | | ○ | ○* | | | |
| 4th a | ○ | | ○ | | ○ | ○ | | | | |
| b | ○ | ○ | ○ | | ○ | ○ | | | | |
| c | | ○ | ○ | | ○ | ○* | | | | |
| 5th | | ○ | ○ | ○ | | | | | ○ | |
| Rev | | | | ○ | ○ | | ○ | ○ | | |

FIG. 19A

| | | CLUTCH MEANS | | | | | | BRAKE MEANS | | | |
|---|---|---|---|---|---|---|---|---|---|---|---|
| | | K1 | K2 | K3 | K4 | K5 | K6 | B1 | B2 | B3 | B4 |
| 1st | | ○ | | | ○* | ○ | | ○ | ○ | | |
| 2nd | | ○ | ○* | | | ○ | | ○ | ○ | | |
| 3rd | | ○ | | ○ | | ○ | | ○* | | | |
| 4th | a | ○ | ○ | ○ | | ○ | | | | | |
|  | b | ○ | ○ | ○ | ○ | ○ | | | | | |
|  | c | | ○ | ○ | ○* | ○ | | | | | |
| 5th | | | ○ | ○ | | ○ | | | | ○ | |
| Rev | | | | ○ | ○ | | | ○ | ○ | | |

FIG. 19B

| | | CLUTCH MEANS | | | | | | BRAKE MEANS | | | |
|---|---|---|---|---|---|---|---|---|---|---|---|
| | | K1 | K2 | K3 | K4 | K5 | K6 | B1 | B2 | B3 | B4 |
| 1st | | ○ | | | ○* | ○ | | ○ | ○ | | |
| 2nd | a | ○ | ○ | | | ○ | | ○ | ○ | | |
|  | b | ○ | ○ | | | ○ | | ○ | | | ○ |
|  | c | ○ | | | | | ○ | ○ | | | ○* |
| 3rd | a | ○ | | ○ | | ○ | | ○ | | | |
|  | b | ○ | | ○ | ○ | | | ○* | | | |
| 4th | a | ○ | ○ | ○ | | ○ | | | | | |
|  | b | ○ | ○ | ○ | ○ | ○ | ○ | | | | |
|  | c | | ○ | ○ | ○* | ○ | | | | | |
| 5th | | | ○ | ○ | | ○ | | | | ○ | |
| Rev | | | | ○ | ○ | | | ○ | ○ | | |

FIG. 19C

| | | CLUTCH MEANS | | | | | | BRAKE MEANS | | | |
|---|---|---|---|---|---|---|---|---|---|---|---|
| | | K1 | K2 | K3 | K4 | K5 | K6 | B1 | B2 | B3 | B4 |
| 1st | | ○ | | | ○* | ○ | | ○ | ○ | | |
| 2nd | | ○ | ○* | | | ○ | | ○ | ○ | | |
| 3rd | a | ○ | | ○ | | ○ | | ○ | | | |
|  | b | ○ | | | ○ | ○ | | ○* | | | |
| 4th | a | ○ | ○ | ○ | | ○ | | | | | |
|  | b | ○ | ○ | ○ | ○ | ○ | ○ | | | | |
|  | c | | | ○ | ○ | ○ | ○* | | | | |
| 5th | | | ○ | ○ | | ○ | | | | ○ | |
| Rev | | | | ○ | ○ | | | ○ | ○ | | |

|  | CLUTCH MEANS | | | | | | | | BRAKE MEANS | | |
|---|---|---|---|---|---|---|---|---|---|---|---|
|  | K1 | K2 | K3 | K4 | K5 | K8 | K9 | K10 | B1 | B2 | B3 |
| 1st | ○ |  |  | ○ | ○ |  |  |  | ○ | ○ |  |
| 2nd | ○ | ○ |  |  | ○ |  |  |  | ○ | ○ |  |
| 3rd |  | ○ |  | ○ |  |  | ○ | ○ | ○ |  |  |
| 4th | ○ |  | ○ | ○ |  | ○ | ○ |  |  |  |  |
| 5th | ○ | ○ | ○ |  | ○ |  |  |  |  |  | ○ |
| Rev | ○ |  | ○ | ○ |  |  |  |  | ○ | ○ |  |

AUTOMATIC TRANSMISSION

BACKGROUND OF THE INVENTION

1. Field of the Invention

This invention relates to an automatic transmission for use in a vehicle.

2. Description of the Prior Art

As is well known, a gear train in an automatic transmission for use in a vehicle is constituted by combining a plurality of planetary gear sets, each of which is mainly provided with three components consisting of a sun gear, a ring gear and a carrier for holding a pinion gear meshing with the sun gear and the ring gear. Namely, the planetary gear set holds either one of the three components stationary, and serves the remaining two components as an input component and an output component to perform the overdriving, retarding and reversing operations. Also, either two of the three components are interconnected to rotate the whole planetary gear set as a single unit. Therefore, the predetermined components themselves of a plurality of planetary gear sets are constantly interconnected or selectively interconnected through clutch means, and the remaining predetermined components thereof are held stationary, so that the rotational speed of an input shaft is changed on multiple stages to be transmitted to an output shaft. Thus, the more the number of the planetary gear sets used in the automatic transmission is, the more the number of gears capable of being set is, so that the automatic transmission improves in power performance and start acceleration property of the vehicle as a whole. However, with the increase of the number of planetary gear sets, the number of necessary engaging means such as a clutch and a brake is increased, whereby the automatic transmission becomes large-sized and increases in weight. Since the automatic transmission is generally accommodated in an engine compartment together with an engine, the automatic transmission requires that the size and weight are respectively as small and light as possible to such an extent that the resultant automatic transmission fulfills the properties necessary for the vehicle, so that the automatic transmission for use in a passenger car for example is constituted so as to set the gears with three forward speeds or four forward speeds including overdrive and one reverse by the use of two or three planetary gear sets.

Among the conventional automatic transmissions, the automatic transmission, which sets four forward speeds including the over-drive by using three planetary gear sets, is generally constituted such that one planetary gear set for so-called over-drive is added to a gear train consisting of two planetary gear sets constituted to set three forward speeds and one reverse, whereby such automatic transmission outputs the rotation transmitted by the two planetary gear sets and overdriven by the planetary gear set for the over-drive. Thus, this automatic transmission reduces in rotational frequency of an engine in travelling at high speed to improve in the silencing property, whereas it does not particularly contribute to the improvement on the power performance of a vehicle, since the width of change gear ratio (ratio of change gear ratio of first gear to that of the highest gear) is not particularly expanded.

Recently, the automatic transmission using three planetary gear sets is constituted such that all three planetary gear sets are constituted so as to participate in the setting of the gear even in the gears of low and medium speed regions. Hence, it is attempted that more gears (for example, five forward speeds and one reverse) are set to expand the width of the change gear ratio.

Since the automatic transmission, in which the first gear is set by compositely acting the all three planetary gear sets, provides a larger value of the change gear ratio, the width of the change gear ratio is expanded to improve in the power performance of the vehicle, and besides, the start acceleration property. However, in the case second, third, fifth or reverse gear, there is a case where any of the planetary gear sets does not participate in the transmission of torque for setting the corresponding gear on which the planetary gear set will be subjected only to idle running. Then, since the relative or absolute rotational frequency of either component in the planetary gear set may be increased, and the relative rotational frequency of the pinion gear held by the carrier to the carrier may be increased. This is derived from the contradictory requirements for increasing the number of gears to be permitted to be set and reducing the weight and size of the automatic transmission, so that the engaging means such as a clutch and a brake is not generally provided between the components themselves, which do not need to be disconnected from each other in setting the gear, and a fixed portion such as a casing. As a result, since the conventional automatic transmission causes the components to be subjected to idle running with high speed on a predetermined gear, the conventional automatic transmission degrades the durability of bearings, and brings about the loss of power and the rise of oil temperature caused by the unnecessary agitation of lubricant oil.

SUMMARY OF THE INVENTION

It is an object of the present invention to provide an automatic transmission capable of restraining the unnecessary rotation of planetary gear sets constituting a gear train.

Another object of the present invention is to provide an automatic transmission which improves in durability by reducing the relative rotation of rotary members themselves constituting a gear train.

A further object of the present invention is to provide an automatic transmission capable of reducing the size of frictionally engaging means.

In order to attain the above objects, an automatic transmission according to the present invention includes a gear train constituted such that a plurality of gear speed are set by a plurality of planetary gear sets, each of which is provided with components including of a sun gear, a ring gear and a carrier, and one of the planetary gear sets on one of the gear speeds does not participate in the transmission of torque from an input shaft to an output shaft on either gear, wherein clutch means for selectively interconnecting at least either two components of the planetary gear set adapted not to participate in the transmission of torque.

Thus, according to the automatic transmission of the present invention, a plurality of gear speeds are set by properly changing the way of interconnecting the components themselves in the plurality of planetary gear sets or properly changing the components to be held stationary or the components to be connected to the input shaft. Then, two components of the planetary gear set itself adapted not to participate in the transmission of torque on the predetermined gear or two respective components of the planetary gear sets themselves adapted not to participate in the torque transmission are interconnected together to unite the whole planetary gear sets, so that the relative rotation between the components in the respective planetary gear sets is not produced to thereby restrain the unnecessary rotation.

The above and further objects and features of the present invention will be more apparent from the following detailed description when the same is read in connection with the accompanying drawings. It must be understood, however, that the drawings are for the purpose of illustration only and are not intended as a definition of limits of this invention.

DETAILED DESCRIPTION OF THE DRAWINGS

FIG. 2 shows an example of a clutch and brake application chart of the first embodiment;

FIG. 15 shows an example of a clutch and brake application chart of the ninth embodiment;

FIG. 16, FIGS. 17A, 17B and 17C, FIGS. 18A, 18B and FIGS. 19A, 19B and 19C show respectively other examples of a practically preferable clutch and brake application chart of the ninth embodiment;

DETAILED DESCRIPTION OF THE PREFERRED EMBODIMENTS

Figures 1, 3:
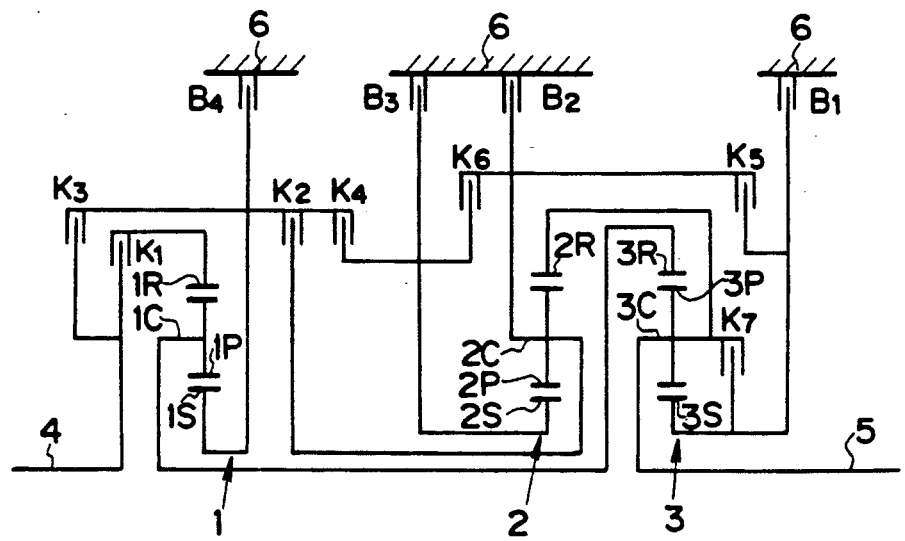
FIG. 1 is a skeleton diagram showing a first embodiment according to the present invention in principle.
FIG. 3 shows another example of a practically preferable clutch and brake application chart of the first embodiment.

An automatic transmission shows in FIG. 1 uses three single pinion type planetary gear sets 1, 2 and 3, which are so constituted that pinion gears 1P, 2P and 3P respectively meshing with sun gears 1S, 2S and 3S and ring gears 1R, 2R and 3R are held by carriers 1C, 2C and 3C, whereby five forward speeds and one reverse are permitted to be set. Namely, these three planetary gear sets 1, 2 and 3 are arranged in the above mentioned order from the side of an input shaft 4, wherein the carrier 1C of the first planetary gear set 1 is constantly connected to the ring gear 3R of the third planetary gear set 3, and the ring gear 2R of the second planetary gear set 2 is constantly connected to the carrier 3C of the third planetary gear set 3. Further, first clutch means K1 is provided between the ring gear 1R of the first planetary gear set 1 and the input shaft 4 to selectively interconnect the ring gear 1R and the input shaft 4, second clutch means K2 is provided between the sun gear 1S of the first planetary gear set 1 and the carrier 2C of the second planetary gear set 2, and third clutch means K3 is provided between the sun gear 1S of the first planetary gear set 1 and the input shaft 4. Also, fourth clutch means K4 is provided between the sun gear 1S of the first planetary gear set 1 and the sun gear 2S of the second planetary gear set 2 to selectively interconnect the sun gears 1S and 2S. Further, fifth clutch means K5 is provided between the carrier 2C of the second planetary gear set 2 and the sun gear 3S of the third planetary gear set 3 to selectively interconnect the carrier 2C and the sun gear 3S. The second and third planetary gear sets 2 and 3 are permitted to rotate as a single unit. For that end, as uniting clutch means, six clutch means K6 is provided between the sun gear 2S and the carrier 2C of the second planetary gear set 2, and seventh clutch means K7 is provided between the sun gear 3S and the carrier 3C of the third planetary gears set 3.

Further, first brake means B1 is provided between the sun gear 3S of the third planetary gear set 3 among the respective components of the three planetary gear sets 1, 2 and 3 and a transmission casing (Hereinafter will be simply referred to as casing) 6 to selectively block the rotation of the sun gear 3S, and second brake means B2 is provided between the carrier 2C of the second planetary gear set 2 and the casing 6 to selectively block the rotation of the carrier 2C. Also, third brake means B3 is provided between the sun gear 2S of the second planetary gear set 2 and the casing 6 to selectively block the rotation of the sun gear 2S, and fourth brake means B4 is provided between the sun gear 1S of the first planetary gear set 1 and the casing 6 to selectively block the rotation of the sun gear 1S.

An output shaft 5 for transmitting the rotation of a propeller shaft or a counter gear (not shown) is connected to the ring gear 2R of the second planetary gear set 2 and the carrier 3C of the third planetary gear set 3, which are connected to each other.

Further, for the connecting structure of the respective members as noted above, use is made of a quill shaft, a solid shaft, a proper connecting drum or like connecting structure employed in a general automatic transmission. Also, for the respective clutch means and brake means, use is made of, in addition to a multi-disc clutch having a plurality of discs and plates, a combination of a one-way clutch and a multi-disc clutch. Further, for the brake means, use may be made of a band brake having a certain degree of one-way characteristics with a transmission capacity of torque varying with the direction of rotation. More specifically, as the band brake, use is made of a band brake as disclosed in specifications and drawings attached to applications of Patent Applications Nos. 63-176270 and 63-221670 which have been filed already by the present applicant.

With the automatic transmission as noted above, five forward speeds and one reverse are permitted to be set, and when the gear ratios (ratio of the number of teeth of sun gear to that of ring gear) of the respective planetary gear sets 1, 2 and 3 are defined as $\rho_1$, $\rho_2$ and $\rho_3$, the change gear ratios of the respective gears are as follows:

First Gear $$1+\rho_3+\rho_1(1+\rho_2+\rho_2\cdot\rho_3)/\rho_2$$

Second Gear $$(1+\rho_1)(1+\rho_3)$$

Third Gear $$(1+\rho)$$

Fourth Gear $$1$$

Fifth Gear $$1/(1+\rho_2)$$

Reverse Gear $$-1/\rho_2$$

Figure 2:
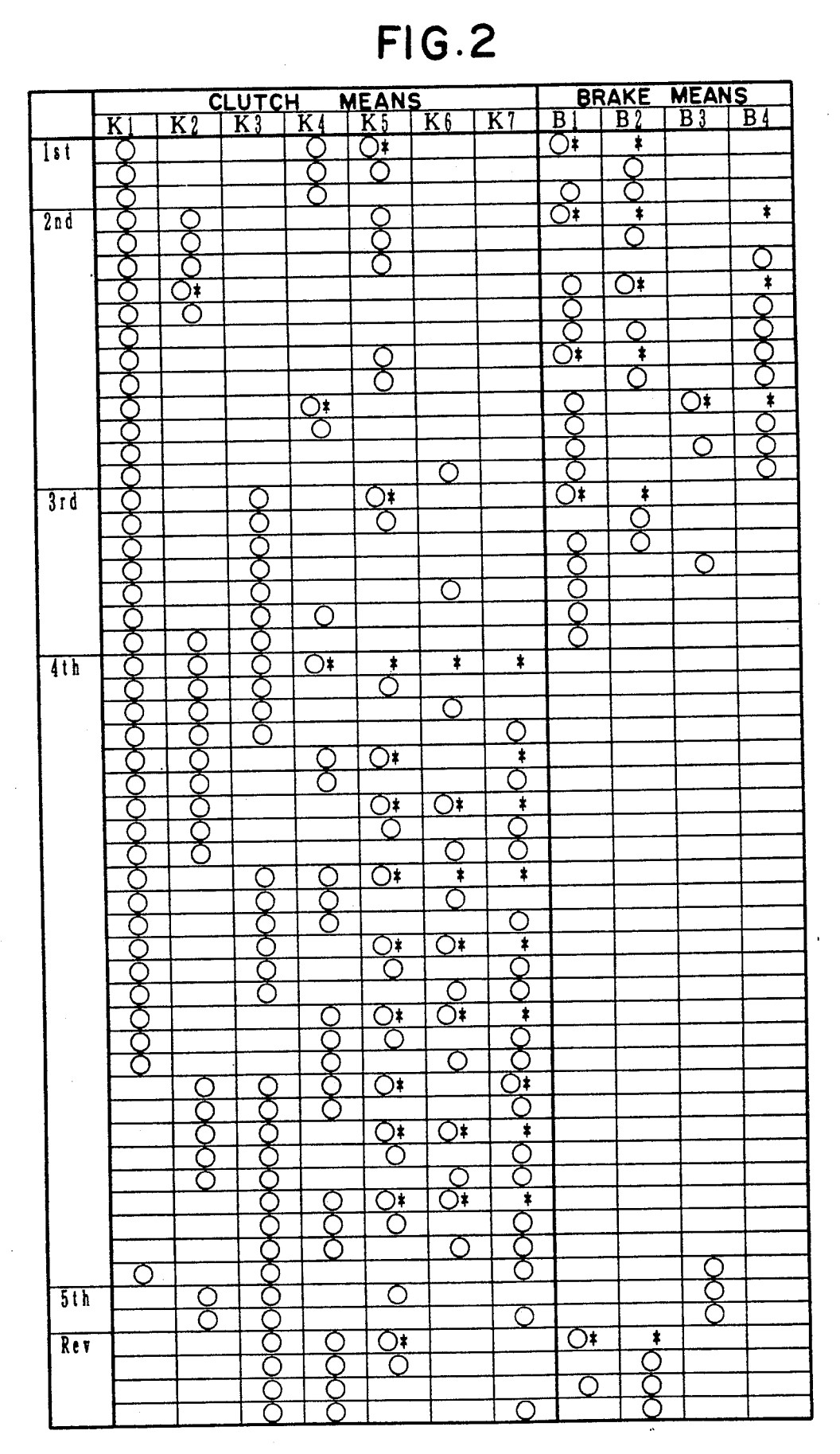

The respective gears as noted above are achieved by engaging or releasing the respective clutch means and brake means as shown on the clutch and brake application chart of FIG. 2. Further, FIG. 2 shows several examples of available engaging patterns. In the clutch and brake application charts on and after FIG. 2, the mark ◯ represents the engaged condition and the blank represents the released condition. Also, in the charts of FIGS. 2 and 15, only the mark * represents that the pertinent clutch or brake means may be added to the clutch or brake means represented by the mark ◯* to be engaged, or the engaged and released conditions may be replaced with each other between the pertinent clutch or brake means represented by the mark ◯*.

As is apparent from the formulae representing the change gear speed ratios as noted above, the first gear among the respective gear speed (also referred to as gears) is so set that all of three planetary gear sets 1, 2 and 3 participate in the transmission of torque, whereas the second gear speed is so set that the second planetary gear set 2 does not participate in the transmission of torque. In this case, if the sixth clutch means K6 is engaged, the sun gear 2S and the carrier 2C are interconnected, so that the whole second planetary gear set 2 rotates as a single unit to prevent the second planetary gear set 2 from the unnecessary relative rotation between these components, and, of course, the pinion gear 2P is not rotated relative to the carrier 2C. Also, in the third gear speed, since the rotation transmitted to the third planetary gear set 3 through the first planetary gear set 1 is reduced by the third planetary gear set 3 to be transmitted to the output shaft 5, the second planetary gear set 2 does not particularly participate in the transmission of torque, so that the whole second planetary gear set 2 is united by the sixth clutch means K6 to prevent the second planetary gear set 2 from the unnecessary rotation. Further, since the fourth gear speed is so set that either one of the second and third planetary gear sets 2 and 3 connected to the output shaft 5 rotates as a single unit and the other does not participate in the torque transmission or the whole gear train rotates as a single unit, the sixth clutch means K6 is engaged to unite the whole second planetary gear set 2, or the seventh clutch means K7 is engaged to unite the whole third planetary gear set 3, so that the unnecessary relative rotation between the respective components of the planetary gear sets 2 and 3 is prevented.

Further, in the fifth gear speed and reverse gear speed, the rotation of the input shaft 4 transmitted through the first planetary gear set 1 is subjected to gear change in the second planetary gear set 2 to be transmitted to the output shaft 5, and the third planetary gear set 3 will not participate in the transmission of torque on these gears. Hence, in these fifth and reverse gears, the seventh clutch means K7 is engaged to unite the whole third planetary gear set 3, so that the unnecessary relative rotation between the respective components in the third planetary gear set 3 is presented.

As is apparent from the above-mentioned embodiment, the sixth and seventh clutch means K6 and K7 are engaged in the predetermined gear which is set by engaging predetermined engaging means other than the sixth and seventh engaging means, and then these engaging means permit to fall into a condition that any gear set does not participate in the torque transmission. Under such embodiment of usage, two components of the second and third planetary gear sets 2 and 3 which do not participate in the torque transmission are interconnected to unite the whole planetary gear sets 2 and 3, so that the respective clutch means K6 and K7 permit to reduce in size and in capacity of torque to be transmitted.

In the embodiment shown in FIG. 1, since the fourth brake means B4 directly brakes the sun gear 1S of the first planetary gear set 1, the second clutch means K2 does not need to serve as a brake for braking the sun gear 1S, so that the second clutch means K2 permits to reduce in capacity.

Further, the automatic transmission in the embodiment shown in FIG. 1 permits to set the respective gears according to various engaging patterns as shown in FIG. 2, whereas the automatic transmission does not need to be actually set to all these engaging patterns, but may be set to proper engaging patterns, if necessary. Namely, the engaging patterns applicable to the stationary conditions right before the beginning of gear change, right after the completion of gear change or after setting to the predetermined gear may be selectively set, and further the proper engaging patterns may be selectively set according to requirements during the gear change (including torque phase and inertia phase).

The requirements or criteria for selecting the engaging pattern to be set during the holding of the gear or during the gear change are determined on the basis of that the selected engaging pattern is advantageous to reduction of load torque relative to the respective gears, carriers or engaging means, or alternation of torque share (alternation of load torque of gears or the like), that the rotational frequency of the respective gears or engaging means (absolute rotational frequency and relative rotational frequency) is reduced, and that gear change controllability such as reduction of simultaneous change-over engaging means in number, the reduction of gear change engaging means in number, and the reduction of rotational variation in the gear change is improved. Also, the engaging pattern is selected by adding particular requirements such as the gear ratios of the respective planetary gear sets 1, 2 and 3.

FIG. 3 shows the specific examples of selection of engaging patterns. On and after FIG. 3, reference symbols a, b, . . . represent that the engaging patterns are changed in the above-mentioned order at the up-shift, whereas the engaging patterns are changed in the opposite order at the down-shift, and the mark # represents that if the pertinent clutch or brake means is provided with the one-way clutch, the one-way clutch is operated to perform the gear change.

When the gear change is performed according to such pattern, the unnecessary rotation in the respective planetary gear sets 1, 2 an 3 is prevented, while the number of engaging means to be controllably changed over in the gear change is reduced to facilitate the gear change control, and besides, to be advantageous to reduction of shocks in the gear change.

Figures 4, 5:
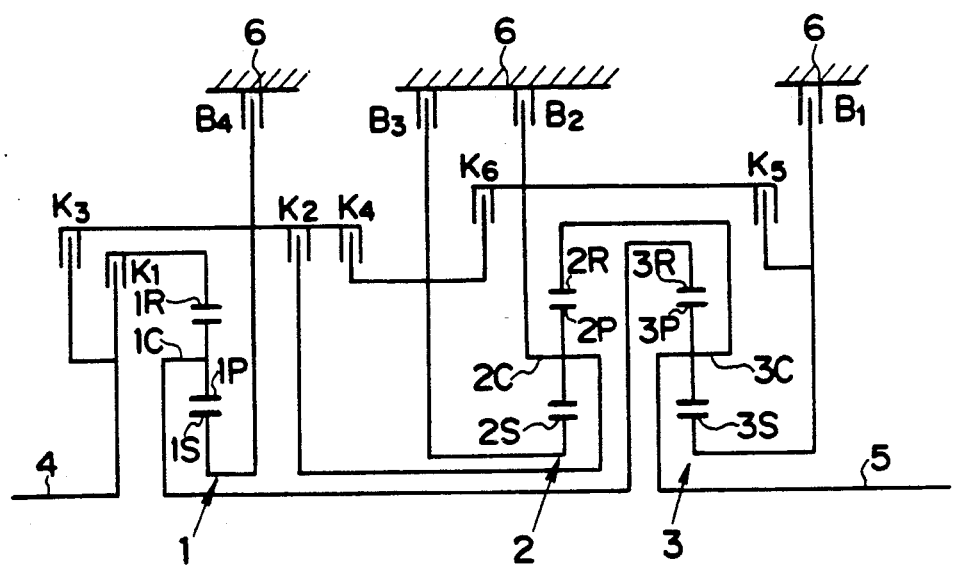
FIG. 4 is a skeleton diagram showing a second embodiment according to the present invention in principle.
FIG. 5 shows an example of a practically preferable clutch and brake application chart of the second embodiment.

Next will be explained another embodiment of the present invention. FIG. 4 shows a second embodiment of the present invention, which is similar to the embodiment shown in FIG. 1 except that the seventh clutch means K7 is removed. Namely, the seventh clutch means K7 is used for uniting the whole third planetary gear set 3 and does not particularly participate in setting of the gear, so that even if the seventh clutch means K7 is removed, the five forward speeds and one reverse are permitted to be set similarly to the case of the automatic transmission in the embodiment shown in FIG. 1. Thus, the second embodiment has a plurality of engaging patterns in the respective gears, and the clutch and brake application chart of the second embodiment is similar to the chart of FIG. 2 except the column of the seventh clutch means K7.

According to the second embodiment shown in FIG. 4, in the second and third gears, the whole second planetary gear set 2 is united by the sixth clutch means K6 to prevent the second planetary gear set 2 from the unnecessary rotation between the respective components thereof. Further, since the fourth brake means B4 directly holds the sun gear 1S of the first planetary gear set 1 stationary, the second clutch means K2 does not need to serve as a brake for braking the sun gear 1S of the first planetary gear set 1, so that the second clutch means K2 permits to reduce in size.

Also, FIG. 5 shows the clutch and brake application chart including engaging patterns preferable in performing the gear change in the automatic transmission according to the second embodiment shown in FIG. 4. In FIG. 5, reference symbols a, b and c in the second and fourth gears represent the order of engaging means to be set in the gear change.

Figures 6, 7A:
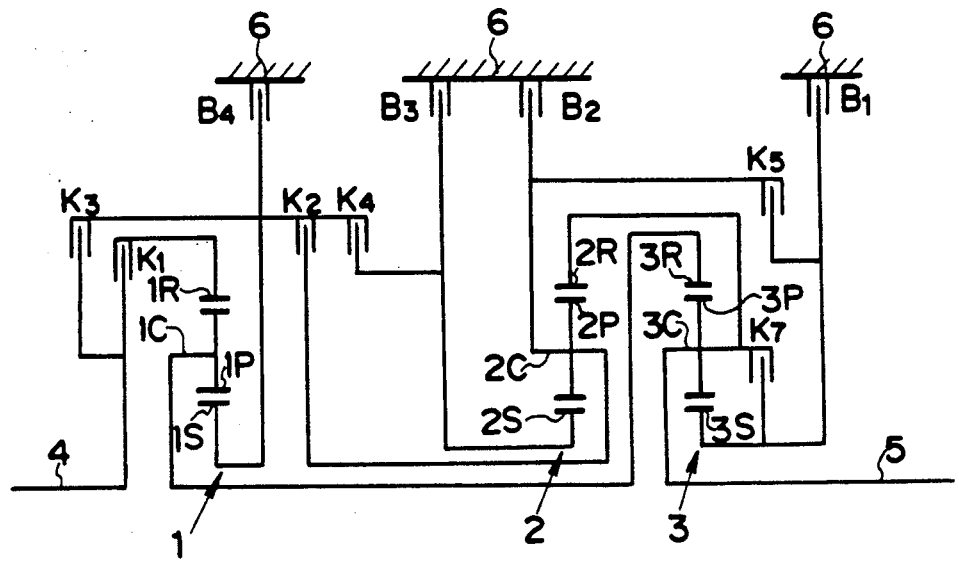
FIG. 6 is a skeleton diagram showing a third embodiment according to the present invention in principle.
FIGS. 7A and 7B show respectively examples of a practically preferable clutch and brake application chart of the embodiment.

FIG. 6 is a skeleton diagram showing a third embodiment according to the present invention. The third embodiment is similar to the embodiment of FIG. 1, except that the sixth clutch means K6 is removed. The sixth clutch means K6 unites the whole second planetary gear set 2 to prevent the second planetary gear set 2 from the rotation between the respective components thereof, and does not particularly participate in setting of gear, so that even if the sixth clutch means K6 is removed, the five forward speeds and one reverse are permitted to be set similarly to the case of the automatic transmission according to the embodiment shown in FIG. 1. Thus, this third embodiment has a plurality of engaging patterns in the respective gears, and the clutch and brake application chart of the third embodiment is similar to the chart of FIG. 2 except the column of the sixth clutch means K6.

According to the third embodiment shown in FIG. 6, in the fifth and reverse gears, the whole third planetary gear set 3 is united by the seventh clutch means K7 to prevent the third planetary gear set 3 from the unnecessary rotation between the respective components thereof. Further, since the fourth brake means B4 directly holds the sun gear 1S of the first planetary gear set 1 stationary, the second clutch means K2 does not need to serve as a brake for braking the sun gear 1S of the first planetary gear set 1, so that the second clutch means K2 permits to reduce in size.

Figures 7B, 8, 9A:
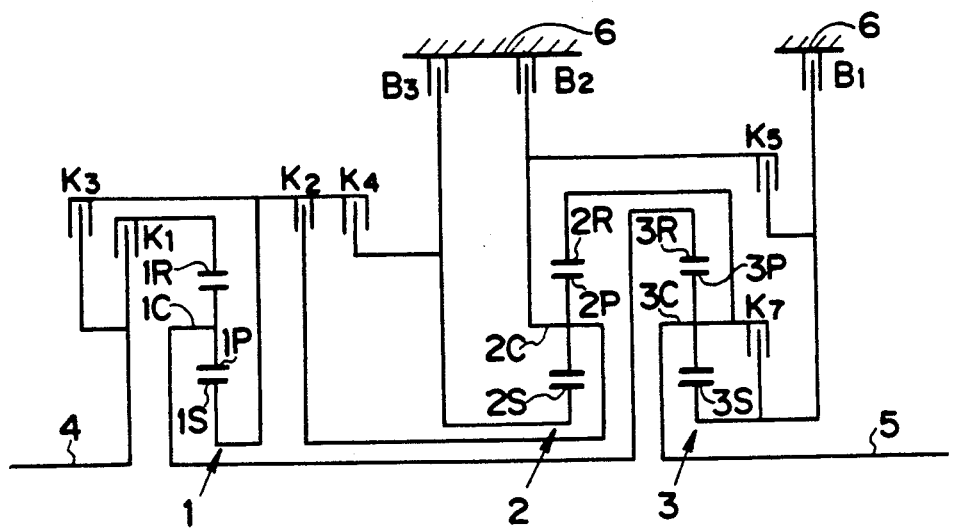
FIG. 8 is a skeleton diagram showing a fourth embodiment according to the present invention in principle.
FIGS. 9A, 9B and 9C show respectively examples of a practically preferable clutch and brake application chart of the fourth embodiment.

FIG. 7A shows the clutch and brake application chart including the engaging patterns preferable in performing the gear change in the automatic transmission according to the third embodiment shown in FIG. 6. FIG. 7B shows another clutch and brake application chart, in place of the chart shown in FIG. 7A. The clutch and brake application chart of FIG. 7B is similar to the chart of FIG. 7B, except that the engaging patterns in the second and third gears are replaced with other engaging patterns.

Even if the gear change is performed according to either pattern of FIG. 7A or 7B, the gear change excellent in controllability is performed.

FIG. 8 shows a fourth embodiment, which is similar to the third embodiment of FIG. 6, except that the fourth brake means B4 is removed. While the fourth brake means B4 holds the sun gear 1S of the first planetary gear set 1 stationary, the second brake means B2 is connected to the sun gear 1S through the second clutch means K2 and the carrier 2C of the second planetary gear set 2, and the third brake means B3 is also connected to the sun gear 1S through the fourth clutch means K4, so that the sun gear 1S of the first planetary gear set 1 is held stationary through either one of these clutch means K2 and K4. Thus, the automatic transmission according to the fourth embodiment shown in FIG. 8 permits to set the five forward speeds and one reverse according to the clutch and brake application chart including the engaging patterns, similar to the chart of FIG. 2 except the column of the fourth brake means B4.

According to the fourth embodiment shown in FIG. 8, the whole third planetary gear set 3, which does not participate in the transmission of torque, is united by the seventh clutch means K7 in the fifth and reverse gear to thereby prevent the third the unnecessary rotation.

Figures 9B, 9C, 10:
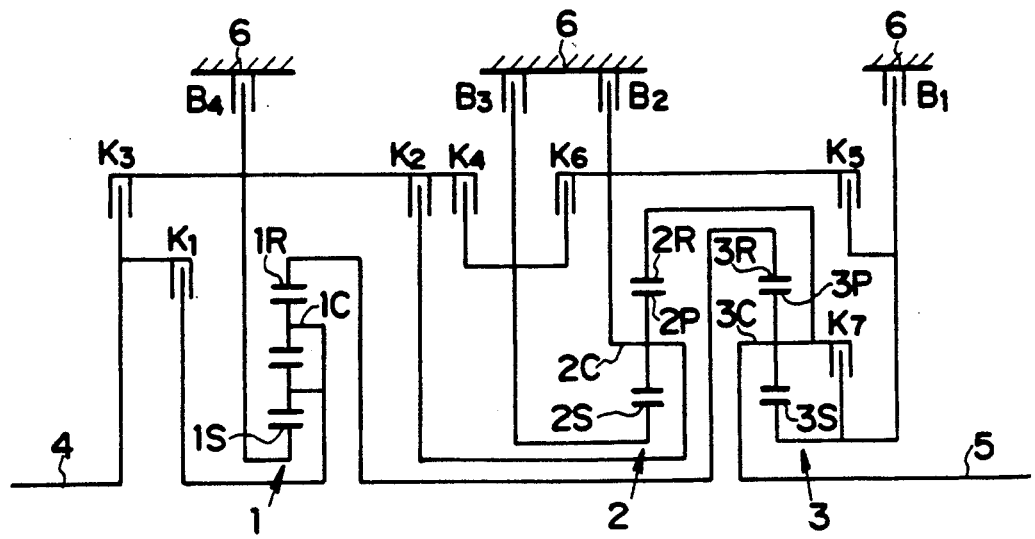
FIG. 10 is a skeleton diagram showing a fifth embodiment according to the present invention in principle.

Further, FIGS. 9A, 9B and 9C show the clutch and brake application charts including the preferable engaging patterns in the automatic transmission according to the fourth embodiment shown in FIG. 8. If the gear change is performed according to the charts shown in FIGS. 9A through 9C, it is possible to perform the gear change, which reduces in number of engaging means to be controllably changed over, and is excellent in controllability and advantageous to reduction of shocks in the gear change. The chart shown in FIG. 9B similar to the chart in FIG. 9A, except that the column c of the fourth gear is changed. Also, the chart shown in FIG. 9C is similar to the chart in FIG. 9A, except that the columns b and c are changed.

FIG. 10 shows a fifth embodiment, which is similar to the embodiment shown in FIG. 1, except that the first planetary gear set 1 is of a double pinion type, instead of the single pinion planetary gear set. Thus, the automatic transmission shown in FIG. 10 is similar to that in FIG. 1, except that the carrier 1C of the first planetary gear set 1 is connected to the input shaft 4 through the first clutch means K1, and the ring gear 1R is connected to the ring gear 3R of the third planetary gear set 3. The fifth embodiment shown in FIG. 10 is different from the embodiment shown in FIG. 1 in change gear ratio only of the first and second gears, of which the first planetary gear set 1 changes the rotation of the input shaft 4 to be transmitted the resultant rotation to other members. For reference, the change gear ratios in the first and second gears are shown as follows:

First Gear $$1 + \rho_3 + \frac{\rho_1 (1 + \rho_2 + \rho_2\rho_3)}{\rho_3 (1 - \rho_2)}$$

Second Gear $$(1+\rho_3)/(1-\rho_1)$$

Further, the automatic transmission shown in FIG. 10 permits to set the five forward speeds and one reverse by engaging or releasing the respective engaging means according to the clutch and brake application chart of FIG. 2.

Thus, the automatic transmission in the fifth embodiment shown in FIG. 10, similarly to the automatic transmission shown in FIG. 1, permits to prevent the second planetary gear set 2 from participating in the transmission of torque in the second through fourth gears. In this case, if the sixth clutch means K6 is engaged, the whole second planetary gear set 2 rotates as a single unit to prevent the second planetary gear set 2 from the unnecessary rotation. Further, in the fifth and reverse gears, since the rotation of the input shaft 4 transmitted to the second planetary gear set 2 through the first planetary gear set 1 is subjected to gear change in the second planetary gear set 2 to be transmitted to the output shaft 5, the third planetary gear set 3 does not participate in the transmission of torque. Thus, if the seventh clutch means K7 is engaged in these gears, the whole third planetary gear set 3 rotates as a single unit to prevent the third planetary gear set 3 from the unnecessary rotation. Also, the second clutch means K2 permits to reduce in size, similarly to the case of embodiment shown in FIG. 1.

The clutch and brake application chart including the practically preferable engaging patterns in the automatic transmission shown in FIG. 10 is similar to the chart of FIG. 3.

Figure 11:
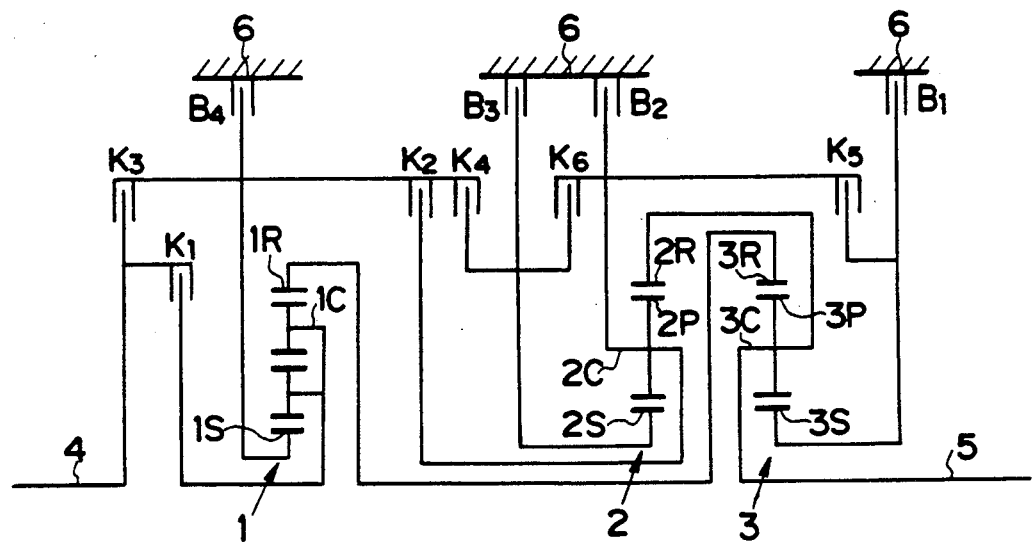
FIG. 11 is a skeleton diagram showing a sixth embodiment according to the present invention in principle.
Figure 12:
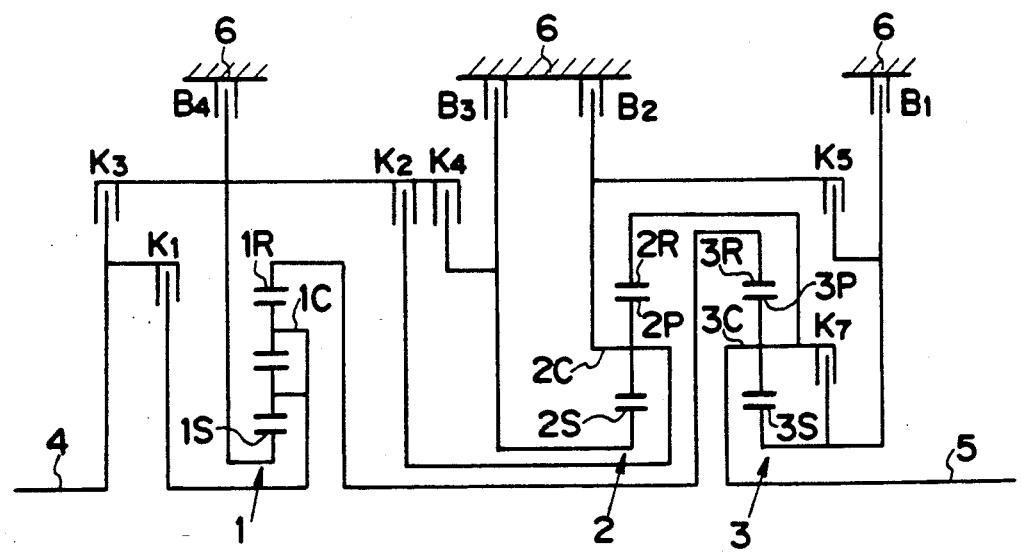
FIG. 12 is a skeleton diagram showing a seventh embodiment according to the present invention in principle.
Figure 13:
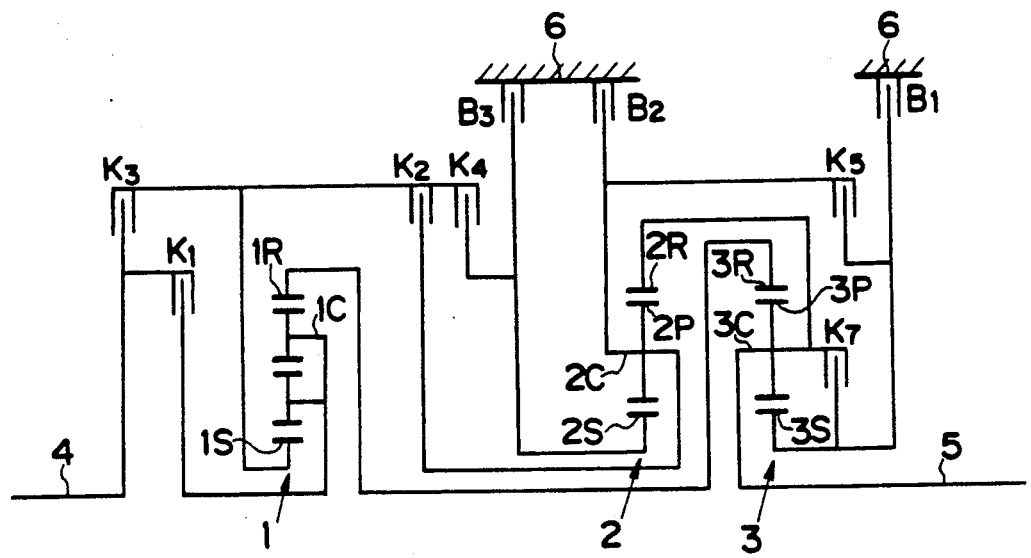
FIG. 13 is a skeleton diagram showing an eighth embodiment according to the present invention in principle.

Next will be explained the improvements of the embodiment shown in FIG. 10. FIG. 11 shows a sixth embodiment which is similar to the embodiment shown in FIG. 10, except that the seventh clutch means K7 is removed. FIG. 12 shows a seventh embodiment which is similar to the embodiment shown in FIG. 10, except that the sixth clutch means K6 is removed. Further, FIG. 13 shows an eighth embodiment which is similar to the embodiment shown in FIG. 10, except that the sixth clutch means K6 and the fourth brake means B4 are removed. The relation between the embodiments shown in FIGS. 11 through 13 and the embodiment shown in FIG. 10 is similar to the relation between the embodiments shown in FIGS. 4, 6 and 8 and the embodiment shown in FIG. 1. Thus, according to the embodiments shown in FIGS. 11 through 13, the whole planetary gear set, which does not participate in the transmission of torque, is united by the sixth or seventh clutch means K6 or K7 to thereby prevent the pertinent planetary gear set from the unnecessary rotation.

The practically preferable clutch and brake application charts in the embodiments shown in FIGS. 11, 12 and 13 are respectively similar to the chart shown in FIG. 5, the charts shown in FIGS. 7A and 7B and the charts shown in FIGS. 9A through 9C.

Figure 14:
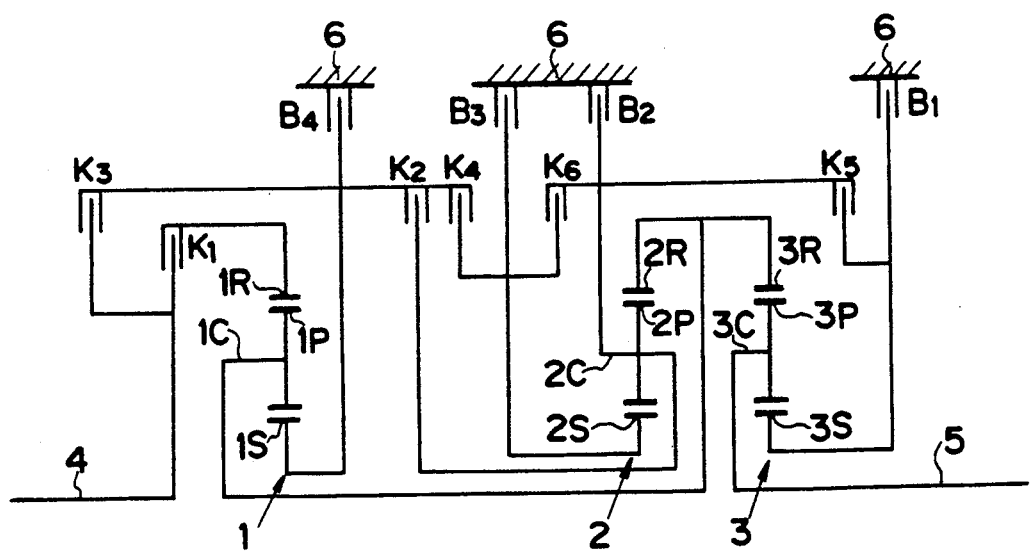
FIG. 14 is a skeleton diagram showing a ninth embodiment according to the present invention in principle.

FIG. 14 shows a ninth embodiment, which is similar to the embodiment shown in FIG. 1, except that the connection between the respective components in the third planetary gear set 3 is changed, that is, the ring gear 3R of the third planetary gear set 3 is constantly connected to the ring gear 2R of the second planetary gear set 2, these ring gears 2R and 3R are connected to the carrier 1C of the first planetary gear set 1, and the output shaft 5 is connected only to the carrier 3C of the third planetary gear set 3.

Thus, the automatic transmission according to the ninth embodiment shown in FIG. 14 permits to set the five forward speeds and one reverse, whereas it is different from the embodiment shown in FIG. 1 in transmission of the rotation from the second planetary gear set 2 to the third planetary gear set 3, so that the change gear ratio of the ninth embodiment shown in FIG. 14 is different from the change gear ratio obtained in accordance with the embodiment shown in FIG. 1 in the first, fifth and reverse gears. For reference, the change gear ratios of the respective gears in accordance with the ninth embodiment are shown as follows:

First Gear $$1+\rho_3+\rho_1(1+\rho_2)(1+\rho_3)/\rho_2$$

Second Gear $$(1+\rho_1)(1+\rho_3)$$

Third Gear $$(1+\rho_3)$$

Fourth Gear $$1$$

Fifth Gear $$-1(1+\rho_3)/(1+\rho_2+\rho_3)$$

Reverse Gear $$-1(1+\rho_3)/\rho_2$$

Thus, these gears are permitted to be set by engaging or releasing the respective engaging means according to either pattern of each gear shown on the clutch and brake application chart of FIG. 15. In this case, since the second planetary gear set 2 is adapted not to participate in the transmission of torque in the second and third gears, the whole second planetary gear set 2 is united by engaging the sixth clutch means K6 under such condition to thereby prevent the second planetary gear set 2 from the unnecessary rotation between the respective components thereof.

FIGS. 16, 17A through 17C, 18A and 18B and 19A through 19C show the combination of the practically preferable engaging patterns among the engaging patterns shown in FIG. 15. Further, the requirements or criteria for selection of the engaging pattern combination are determined as mentioned above. Among the clutch and brake application charts shown in FIGS. 16 through 19, the chart shown in FIG. 17B is similar to the chart shown in FIG. 17A except the engaging patterns shown in the columns of c through f of the second gear, the third gear, fourth gear and fifth gear, the chart shown in FIG. 17C is similar to the chart in FIG. 17B except the engaging patterns shown in the columns of b and c of the fourth gear and the fifth gear. Also, the chart shown in FIG. 18B is similar to the chart in FIG. 18A except the engaging patterns shown in the columns of the second and third gears. Further, the chart shown in FIG. 19B is similar to the chart in FIG. 19A except the engaging patterns shown in the columns of the second and third gears, and the chart shown in FIG. 19C is similar to the chart in FIG. 19A except the engaging patterns shown in the columns of the third through fifth gears.

Even in the gear change on the basis of either clutch and brake application chart as noted above, while at least two engaging means are simultaneously changed over under the condition that the gear is held, either one of the engaging means will be changed over in changing the gear, so that it is possible to perform the gear control excellent in change gear controllability and effective in damping of shocks in the gear change.

Figure 20:
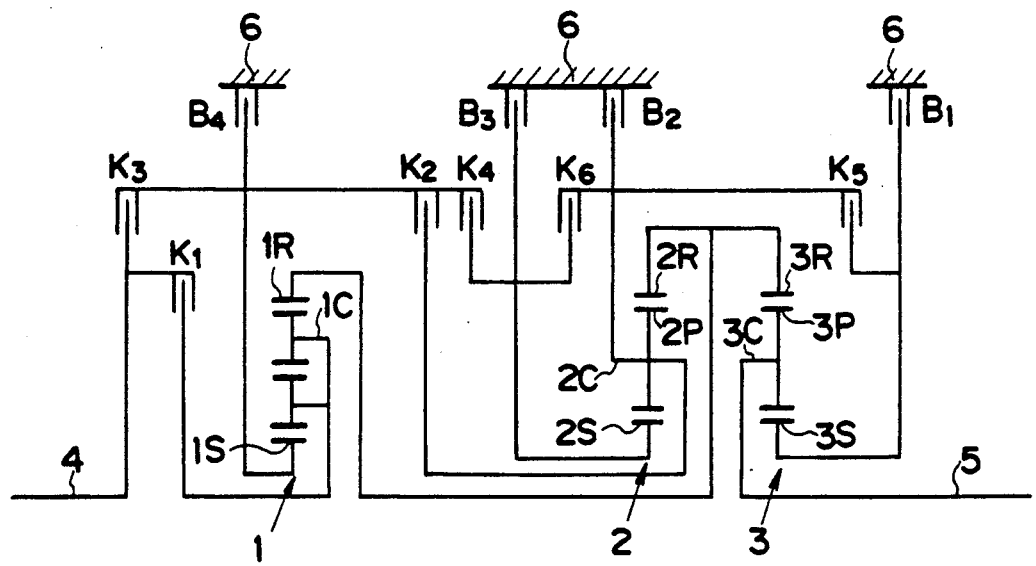
FIG. 20 is a skeleton diagram showing a tenth embodiment according to the present invention in principle.

FIG. 20 is a skeleton diagram showing a tenth embodiment according to the present invention. The tenth embodiment shown in FIG. 20 is similar to the embodiment shown in FIG. 14, except that the first planetary gear set 1 is replaced with a double pinion type planetary gear set, wherein the carrier 1C of the first planetary gear set 1 is connected to the input shaft 4 through the first clutch means K1, and the ring gear 1R is connected to the ring gears 2R and 3R of the second and third planetary gear sets 2 and 3.

Figure 21:
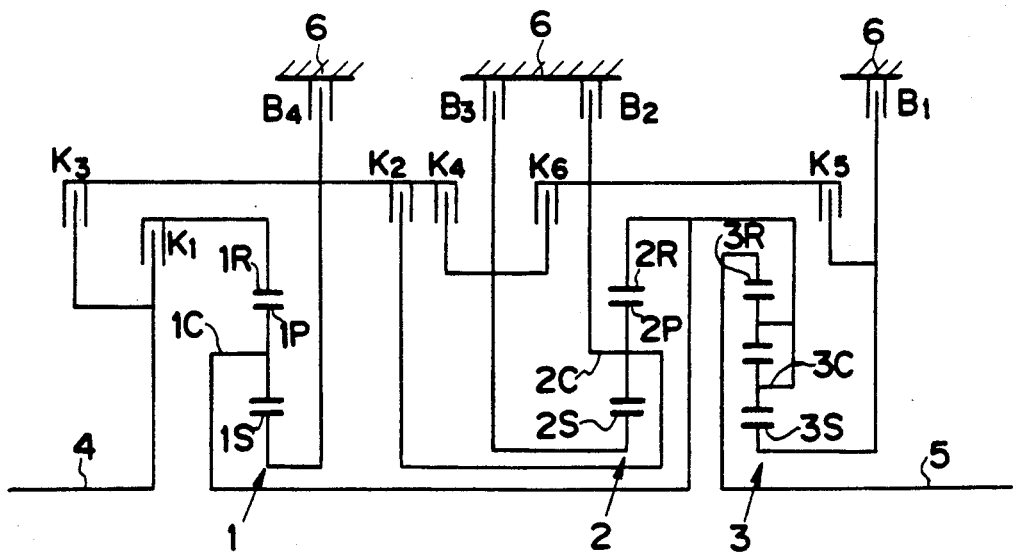
FIG. 21 is a skeleton diagram showing an eleventh embodiment according to the present invention in principle.

FIG. 21 shows an eleventh embodiment, which is similar to the embodiment shown in FIG. 14, except that the third planetary gear set 3 is replaced with a double pinion type planetary gear set, wherein the carrier 3C of the third planetary gear set 3 is connected to the ring gear 2R of the second planetary gear set 2, the carrier 1C of the first planetary gear set 1 is connected to the carrier 3C and the ring gear 2R, and the output shaft 5 is connected to the ring gear 3R of the third planetary gear set 3.

The automatic transmissions according to the embodiments shown in FIGS. 20 and 21 permit to set the five forward speeds and one reverse by engaging or releasing the respective engaging means similarly to the case in the automatic transmission according to the embodiment shown in FIG. 14. Thus, the whole second planetary gear set 2 is united by engaging the sixth clutch means K6 in the second and third gears to thereby prevent the second planetary gear set 2 from the unnecessary rotation between the respective components thereof.

The respective engaging patterns for use in the practically preferable gear change are shown on the clutch and brake application charts of FIGS. 16 through 9, similarly to the case in the automatic transmission according to the embodiment shown in FIG. 14.

While the respective embodiments as noted above are so constituted that two components of the second or third planetary gear set 2 or 3 itself are interconnected through the sixth or seventh clutch means K6 or K7 to unite the respective planetary gear sets 2 and 3, the present invention is not limited to these embodiments. When a plurality of planetary gear sets adapted not to participate in the transmission of torque are provided, the respective components themselves in these planetary gear sets may be interconnected to unite the whole planetary gear sets, as will be shown in a twelfth embodiment of FIG. 22.

Figures 22, 23:
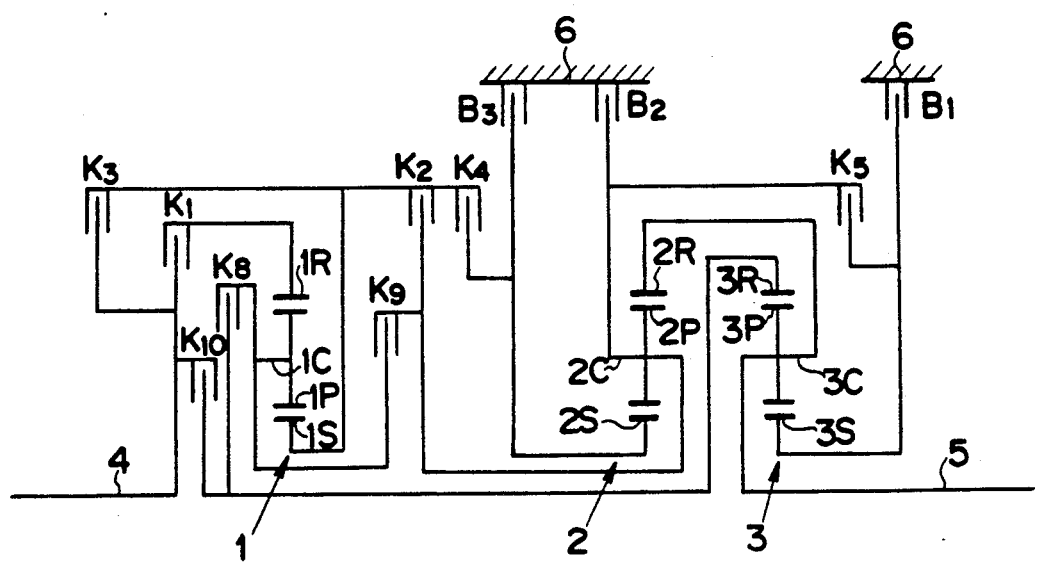
FIG. 22 is a skeleton diagram showing a twelfth embodiment according to the present invention.
FIG. 23 shows an example of a clutch and brake application chart of the twelfth embodiment.

The automatic transmission according to the twelfth embodiment shown in FIG. 22 is similar to the embodiment shown in FIG. 1, except that the fourth brake means B4 and the sixth and seventh clutch means K6 and K7 are removed, whereas, instead of these clutch means, eighth clutch means K8 is provided to selectively interconnect the carrier 1C of the first planetary gear set 1 and the ring gear 3R of the third planetary gear set 3, ninth clutch means K9 is provided to selectively interconnect the carrier 1C of the first planetary gear set 1 and the carrier 2C of the second planetary gear set 2, and tenth clutch means K10 is provided to selectively interconnect the input shaft 4 and the ring gear 3R of the third planetary gear set 3. Even in the twelfth embodiment, the five forward speeds and one reverse are permitted to be set, and FIG. 23 shows the clutch and brake application chart thereof. In the third gear among the respective gears of the automatic transmission shown in FIG. 22, since the second, fourth, ninth and tenth clutch means K2, K4, K9 and K10 are engaged with the first brake means B1, the ring gear 3R of the third planetary gear set 3 rotates forward at the same speed as the input shaft 4 under the condition that the sun gear 3S is held stationary, so that the carrier 3C and the output shaft 5 connected to the carrier 3C are rotated forward slower than the input shaft 4. Namely, the third planetary gear set 3 performs the retarding operation, whereas the first and second planetary gear sets 1 and 2 do not participate in the transmission of torque. Then, in the first and second planetary gear sets 1 and 2, since the sun gear 1S of the first planetary gear set 1 is connected to the sun gear 2S and the carrier 2C of the second planetary gear set 2 through the second and fourth clutch means K2 and K4, and simultaneously the carrier 1C of the first planetary gear set 1 is connected to the carrier 2C of the second planetary gear set 2 through the ninth clutch means K9, the whole first and second planetary gear sets 1 and 2 are united to rotate the ring gear 2R of the second planetary gear set 2 together with the carrier 3C of the third planetary gear set 3 under such condition. Therefore, the whole first and second planetary gear sets 1 and 2 rotate forward at the same speed as the output shaft 5 rotating slower than the input shaft 4. Namely, the first and second planetary gear sets 1 and 2 are free from the relative rotation between the respective components thereof. Further, the rotation of the whole first and second planetary gear sets 1 and 2 are reduced in comparison with the case in the abovementioned respective embodiment.

While the respective embodiments have been described with reference to the automatic transmission capable of setting the five forward speeds and one reverse by using three planetary gear sets, the present invention is not limited to these embodiments. To be brief, the automatic transmission capable of setting a plurality of gears by using a plurality of planetary gear sets will do. Further, the gear on which either of the planetary gear sets fall into no-load condition is not limited to the second, third, fifth and reverse gears as shown in the respective embodiments. To be brief, either planetary gear set falling into the no-load condition on either gear will do. Furthermore, the clutch means for uniting the whole of either planetary gear set according to the present invention is adapted to be provided not only between the respective components as described in the respective embodiments, but also between other two components.

Hereinafter will be described the advantages obtained in accordance with the present invention. Since the automatic transmission of the present invention is provided with the clutch means for uniting the whole planetary gear set rotating with no-load, either of the respective components in the pertinent planetary gear set is prevented from rotating at high speed, while the relative rotational frequency of the pinion gear to the carrier is reduced, so that the automatic transmission of the present invention improves in durability of bearings for supporting these components. Further, the difference in rotational frequency between before an after the gear change is reduced to damp the shocks in the gear change. Also, the automatic transmission of the present invention improves in life of the bearings between the planetary gear set and the ambient members thereof, and besides, the agitation of lubricant oil is reduced to prevent the oil temperature and oil level from rising.

What is claimed is:

1. An automatic transmission, comprising:
   an input shaft;
   an output shaft; and
   a gear train constituted such that a plurality of gear speeds are set by a plurality of planetary gear sets, each of which is provided with components including a sun gear, a ring gear and a carrier, and one of the planetary gear sets on one of the gear speeds does not participate in the transmission of torque from said input shaft to said output shaft;
   characterized in that a single or a plurality of uniting clutch means are provided to selectively interconnect at least either two of the components in the planetary gear set adapted not to participate in said transmission of torque.

2. An automatic transmission according to claim 1, wherein said gear train includes a single pinion type first planetary gear set provided with a first sun gear, a first ring gear and a first carrier for holding a pinion gear meshing with said first sun gear and said first ring gear, a single pinion type second planetary gear set provided with a second sun gear constantly or selectively connected to said first sun gear, a second ring gear disposed to be concentrical with said second sun gear and a second carrier for holding a pinion gear meshing with said second sun gear and second ring gear, and a single pinion type third planetary gear set provided with a third sun gear constantly or selectively connected to said second carrier, a third ring gear constantly or selectively connected to said first carrier and a third carrier for holding a pinion gear meshing with said third sun gear and said third ring gear and constantly or selectively connected to said second ring gear, and said uniting clutch means consists of at least either one of a clutch for interconnecting said second sun gear and said second carrier and a clutch for interconnecting said third sun gear and said third carrier.

3. An automatic transmission according to claim 2, wherein said uniting clutch means has a multi-disc clutch for interconnecting said second sun gear and said second carrier.

4. An automatic transmission according to claim 2, wherein said uniting clutch means has a multi-disc clutch for interconnecting said third sun gear and said third carrier.

5. An automatic transmission according to claim 2, wherein said uniting clutch means has a multi-disc clutch for interconnecting said second sun gear and said second carrier and a multi-disc clutch for interconnecting said third sun gear and said third carrier.

6. An automatic transmission according to claim 2, wherein it further comprises first clutch means for interconnecting said first ring gear and said input shaft, second clutch means for interconnecting said first sun gear and said second carrier, third clutch means for interconnecting said first sun gear and said input shaft, fourth clutch means for interconnecting said first sun gear and said second sun gear, fifth clutch means for interconnecting said second carrier and said third sun gear, first brake means for selectively stopping the rotation of said third sun gear, second brake means for selectively stopping the rotation of said second carrier and third brake means for selectively stopping the rotation of said second sun gear, and said output shaft is connected to said third carrier.

7. An automatic transmission according to claim 6, wherein it further comprises fourth brake means for selectively stopping the rotation of said first sun gear.

8. An automatic transmission according to claim 6, wherein said uniting clutch means is constituted so as to interconnect said third sun gear and said third carrier.

9. An automatic transmission according to claim 6, wherein said uniting clutch means is constituted so as to interconnect said second sun gear and said second carrier.

10. An automatic transmission according to claim 6, wherein said uniting clutch means is constituted so as to interconnect said third sun gear and said third carrier.

11. An automatic transmission according to claim 7, wherein said uniting clutch means has a multi-disc clutch for interconnecting said second sun gear and said second carrier and a multi-disc clutch for interconnecting said third sun gear and said third carrier.

12. An automatic transmission according to claim 2, wherein it further comprises first clutch means for interconnecting said first ring gear and said input shaft, second clutch means for interconnecting said first sun gear and said second carrier, third clutch means for interconnecting said first sun gear and said input shaft, fourth clutch means for interconnecting said first sun gear and said second sun gear, second brake means for selectively stopping the rotation of said second carrier, and third brake means for selectively stopping the rotation of said second sun gear, and said output shaft is connected to said third carrier.

13. An automatic transmission according to claim 1, wherein said gear train includes a double pinion type fourth planetary gear set provided with a fourth sun gear, a fourth carrier for holding a pinion gear meshing with said fourth sun gear and another pinion gear meshing with said pinion gear and a fourth ring gear meshing with said another pinion gear, a single pinion type second planetary gear set provided with a second sun gear constantly or selectively connected to said fourth sun gear, a second ring gear disposed to be concentrical with said second sun gear and a second carrier for holding a pinion gear meshing with said second sun gear and second ring gear, and a single pinion type third planetary gear set provided with a third sun gear constantly or selectively connected to said second carrier, a third ring gear constantly or selectively connected to said first ring gear and a third carrier for holding a pinion gear meshing with said third sun gear and said third ring gear and constantly or selectively connected to said second ring gear, and said uniting clutch means includes at least either one of a clutch for interconnecting said second sun gear and said second carrier and a clutch for interconnecting said third sun gear and said third carrier.

14. An automatic transmission according to claim 13, wherein it further comprises sixth clutch means for interconnecting said fourth carrier and said input shaft, seventh clutch means for interconnecting said fourth sun gear and said second carrier, eighth clutch means for interconnecting said fourth sun gear and said input shaft, ninth clutch means for interconnecting said fourth sun gear and said second sun gear, second brake means for selectively stopping the rotation of said second carrier, and third brake means for selectively stopping the rotation of said second sun gear, and said output shaft is connected to said third carrier.

15. An automatic transmission according to claim 14, wherein it further comprises fifth clutch means for interconnecting said second carrier and said third sun gear, and first brake means for selectively stopping the rotation of said third sun gear, and said uniting clutch means is constituted so as to interconnect said third sun gear and said third carrier.

16. An automatic transmission according to claim 15, wherein it further comprises fifth brake means for selectively stopping the rotation of said fourth sun gear.

17. An automatic transmission according to claim 14, wherein it further comprises fifth clutch means for interconnecting said second carrier and said third sun gear, first brake means for selectively stopping the rotation of said third sun gear, and fifth brake means for selectively stopping the rotation of said fourth sun gear, and said uniting clutch means has a clutch for interconnecting said second sun gear and said second carrier and a clutch for interconnecting said third sun gear and said third carrier.

18. An automatic transmission according to claim 14, wherein it further comprises fifth clutch means for interconnecting said second carrier and said third sun gear, first brake means for selectively stopping the rotation of said third sun gear, and fifth brake means for selectively stopping the rotation of said fourth sun gear, and said uniting clutch means has a clutch for interconnecting the second sun gear and said second carrier.

19. An automatic transmission according to claim 1, wherein said gear train includes a single pinion type first planetary gear set provided with a first sun gear, a first ring gear and a first carrier for holding a pinion gear meshing with said first sun gear and said first ring gear, a second planetary gear set provided with a second sun gear constantly or selectively connected to said first sun gear, a second ring gear disposed to be concentrical with said second sun gear and a second carrier for holding a pinion gear meshing with said second sun gear and second ring gear, and a third planetary gear set provided with a third sun gear constantly or selectively connected to said second carrier, a third ring gear constantly or selectively connected to said first carrier and said second ring gear and a third carrier for holding a pinion gear meshing with said third sun gear and said third ring gear, and said uniting clutch means has a clutch for interconnecting said second sun gear and said second carrier.

20. An automatic transmission according to claim 19, wherein it further comprises first clutch means for interconnecting said first ring gear and said input shaft, second clutch means for interconnecting said first sun gear and said second carrier, third clutch means for interconnecting said first sun gear and said input shaft, fourth clutch means for interconnecting said first sun gear and said second sun gear, fifth clutch means for interconnecting said second carrier and said third sun gear, first brake means for selectively stopping the rotation of said third sun gear, second brake means for selectively stopping the rotation of said second carrier, third brake means for selectively stopping the rotation of said second sun gear, and fourth brake means for selectively stopping the rotation of said first sun gear, and said output shaft is connected to said third carrier.

21. An automatic transmission according to claim 1, wherein said gear train includes a double pinion type fourth planetary gear set provided with a fourth sun gear, a fourth carrier for holding a pinion gear meshing with said fourth sun gear and another pinion gear meshing with said pinion gear and a fourth ring gear meshing with said another pinion gear, a single pinion type second planetary gear set provided with a second sun gear constantly or selectively connected to said fourth sun gear, a second ring gear disposed to be concentrical with said second sun gear and a second carrier for holding a pinion gear meshing with said second sun gear and second ring gear, and a single pinion type third planetary gear set provided with a third sun gear constantly or selectively connected to said second carrier, a third ring gear constantly or selectively connected to said fourth ring gear and said second ring gear and a third carrier for holding a pinion gear meshing with said third sun gear and said third ring gear, and said uniting clutch means has a clutch for interconnecting said second sun gear and said second carrier.

22. An automatic transmission according to claim 21, wherein it further comprises sixth clutch means for interconnecting said fourth carrier and said input shaft, seventh clutch means for interconnecting said fourth sun gear and said second carrier, eighth clutch means for interconnecting said fourth sun gear and said input shaft, ninth clutch means for interconnecting said fourth sun gear and said second sun gear, fifth clutch means for interconnecting said second carrier and said third sun gear, first brake means for selectively stopping the rotation of said third sun gear, second brake means for selectively stopping the rotation of said second carrier, third brake means for selectively stopping the rotation of said second sun gear, and fifth brake means for selectively stopping the rotation of said fourth sun gear, and said output shaft is connected to said third carrier.

23. An automatic transmission according to claim 1, wherein said gear train includes a single pinion type first planetary gear set provided with a first sun gear, a first ring gear and a first carrier for holding a pinion gear meshing with said first sun gear and said ring gear, a single pinion type second planetary gear set provided with a second sun gear constantly or selectively connected to said first sun gear, a second ring gear disposed to be concentrical with said second sun gear and a second carrier for holding a pinion gear meshing with said second sun gear and said second ring gear, and a double pinion type fifth planetary gear set provided with a fifth sun gear constantly or selectively connected to said second carrier, a fifth carrier for holding a pinion gear meshing with said fifth sun gear and another pinion gear meshing with said pinion gear and constantly or selectively connected to said first carrier and said second ring gear and a fifth ring gear meshing with said another pinion gear, and said uniting clutch means is constituted so as to interconnect said second sun gear and said second carrier:.

24. An automatic transmission according to claim 23, wherein it further comprises first clutch means for interconnecting said first ring gear and said input shaft, second clutch means for interconnecting said first sun gear and said second carrier, third clutch means for interconnecting said first sun gear and said input shaft, fourth clutch means for interconnecting said first sun gear and said second sun gear, fifth clutch means for interconnecting said second carrier and said third sun gear, first brake means for selectively stopping the rotation of said fifth sun gear, second brake means for selectively stopping the rotation of said second carrier, third brake means for selectively stopping the rotation of said second sun gear, and fourth brake means for selectively stopping the rotation of said first sun gear, and said output shaft is connected to said fifth ring gear.

25. An automatic transmission according to claim 1, wherein said gear train includes first through third planetary gear sets, each of which is provided with a sun gear, a ring gear and a carrier, second clutch means is provided to interconnect said sun gear of said first planetary gear set, fourth clutch means is provided to interconnect said sun gear of said first planetary gear set and said sun gear of said second planetary gear set, and said uniting clutch means has a clutch for interconnecting said carrier of said first planetary gear set and said carrier of said second planetary gear set.

26. An automatic transmission according to claim 25, wherein it further comprises first clutch means for interconnecting said ring gear of said first planetary gear set and said input shaft, third clutch means for interconnecting said sun gear of said first planetary gear set and said input shaft, fifth clutch means for interconnecting said carrier of said second planetary gear set and said sun gear of said third planetary gear set, tenth clutch means for interconnecting said carrier of said first planetary gear set and said ring gear of said third planetary gear set, eleventh clutch means for interconnecting said ring gear of said third planetary gear set and said input shaft, first brake means for selectively stopping the rotation of said carrier of said second planetary gear set, said ring gear of said second planetary gear set is constantly connected to said carrier of said third planetary gear set, and said output shaft is connected to said carrier of said third planetary gear set.

* * * * *

UNITED STATES PATENT AND TRADEMARK OFFICE
CERTIFICATE OF CORRECTION

PATENT NO. : 5,087,232
DATED : 02/11/92
INVENTOR(S) : TOSHIYUKI ASADA

It is certified that error appears in the above-identified patent and that said Letters Patent is hereby corrected as shown below:

Column 15, line 8, after "and" insert --said--.

Column 15, line 60, change "the" to --said--.

Column 16, line 2, after "and" insert --said--.

Column 16, line 39, after "and" insert --said--.

Column 17, line 26, change "third" to --fifth--.

Column 18, line 8, after "set" insert --and said carrier of said second planetary gear set--.

Column 18, line 27, after "said" (first occurrence) insert --sun gear of said third planetary gear set, second brake means for selectively stopping the rotation of said--.

UNITED STATES PATENT AND TRADEMARK OFFICE
CERTIFICATE OF CORRECTION

PATENT NO. : 5,087,232

DATED : 02-11-92

INVENTOR(S) : Toshiyuki Asada

It is certified that error appears in the above-identified patent and that said Letters Patent is hereby corrected as shown below:

Column 18, line 28, before "said" (first occurrence) insert --and third brake means for selectively stopping the rotation of said sun gear of said second planetary gear set,--.

Signed and Sealed this

Fifteenth Day of June, 1993

Attest:

MICHAEL K. KIRK

Attesting Officer

Acting Commissioner of Patents and Trademarks